United States Patent
Johnson

[11] 3,715,287
[45] Feb. 6, 1973

[54] ION EXCHANGE DEMINERALIZING SYSTEM

[75] Inventor: Allan M. Johnson, Reseda, Calif.

[73] Assignee: CCI Aerospace Corporation, Van Nuys, Calif.

[22] Filed: Jan. 21, 1971

[21] Appl. No.: 108,305

[52] U.S. Cl. ..................204/301, 210/34, 210/37, 210/38, 210/195, 210/259
[51] Int. Cl.......................B01d 15/04, B01d 15/06
[58] Field of Search ........204/151, 180, 301; 210/30, 210/34, 37, 38, 195, 259

[56] References Cited

UNITED STATES PATENTS

| | | | |
|---|---|---|---|
| 2,688,572 | 9/1954 | Warshaw | 210/34 X |
| 3,063,924 | 11/1962 | Gomella | 204/180 |
| 3,074,864 | 1/1963 | Gaysowski | 204/151 |
| 3,515,664 | 6/1970 | Johnson et al. | 204/301 |

*Primary Examiner*—Samih N. Zaharna
*Attorney*—Robert E. Geauque

[57] ABSTRACT

A preconditioner which is used for treating raw water before utilization in a water treatment or utilization process and which receives the concentrated waste water returning from the process. The preconditioner has two tanks which can contain either a permeable, strong acid cation exchanger or a permeable, weak acid resin or both. The tanks are connected in a push-pull arrangement, i.e., one tank receives the incoming raw water and the waste water leaves through the other tank. The strong acid cation exchanger in a preconditioner serves to presoften the water and the weak base anion exchanger in a preconditioner serves to add acid to the incoming water. The high salinity return water from the treatment or utilization process is discharged through the other tank to regenerate the preconditioner substance.

A storage tank-salinity buffer combination receives the product water from a demineralizing unit and the tank contains a mixture of anion and cation responsive materials and a weak base material. The mixture of anion and cation responsive materials serves to soften the product during high demand periods and the weak base serves to remove acid during the same periods. During the off supply periods, the weak base releases acid to help regenerate both the preconditioner and cation responsive storage material and the mixture of cation and anion responsive materials releases salt to the product water which is then removed. The preconditioner and storage tank-salinity buffer combination can be utilized with different types of demineralization units.

4 Claims, 5 Drawing Figures

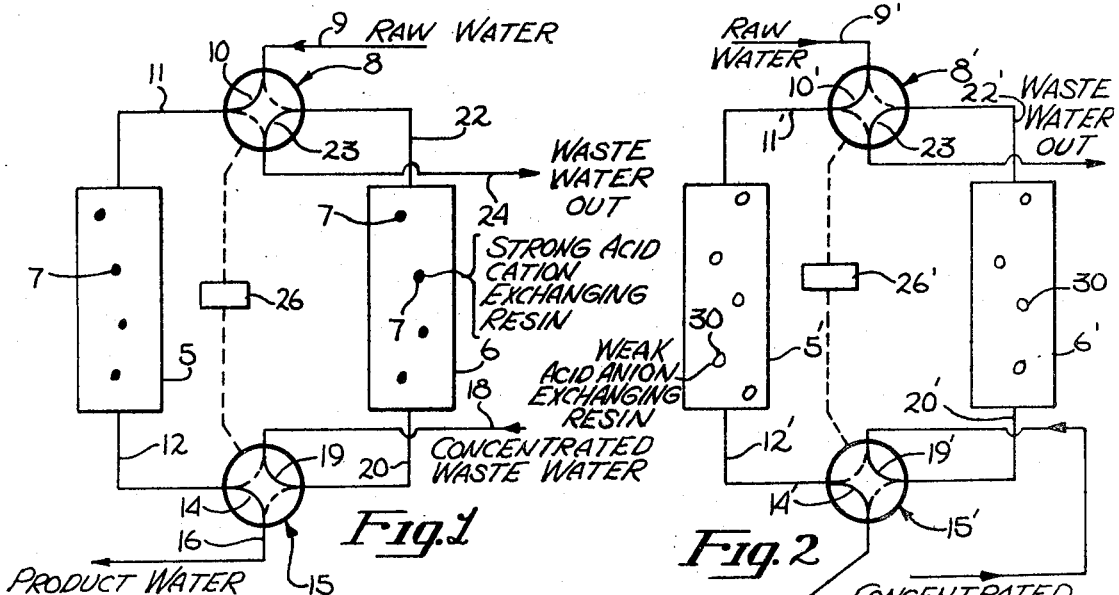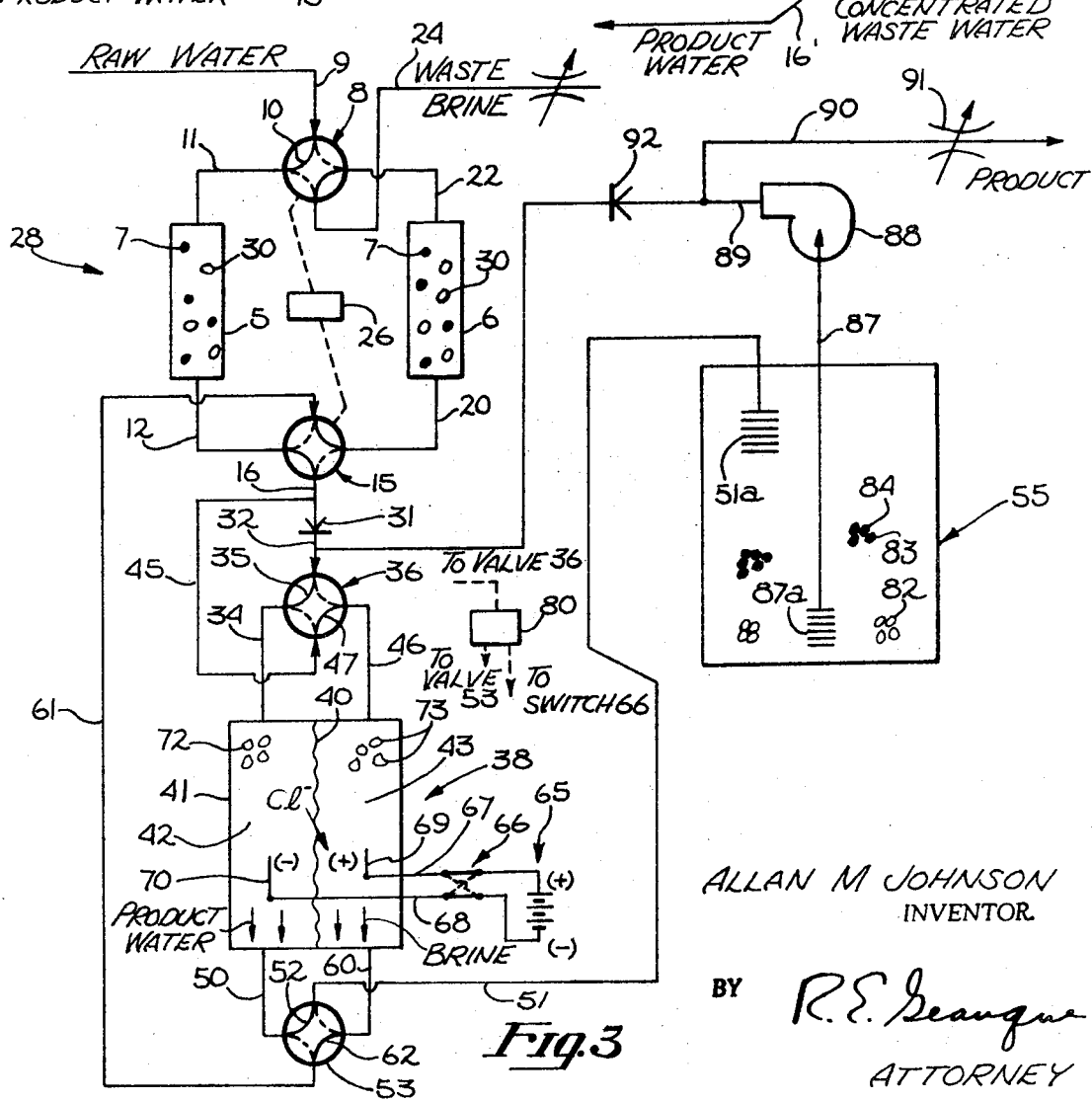

ALLAN M. JOHNSON
INVENTOR.

BY R.S. Geaugue
ATTORNEY

ION EXCHANGE DEMINERALIZING SYSTEM

BACKGROUND OF THE INVENTION

A number of processes have been utilized for the demineralizing of water, such as distillation, freezing, electrodialysis and reverse osmosis. In U.S. Pat. No. 3,515,664, assigned to the same assignee, the fluid electrolyte flows through permeable electrodes which are alternately anion and cation collecting electrodes, insulated from one another by porous separations. The electrodes can consist of carbon granules coated with an ion exchange material in fluid form which is polymerized to render the material insoluble. The adjacent electrodes are oppositely charged from a source of direct current which can be reversed in polarity.

In all of these processes, the concentration of substances, such as calcium carbonate, goes beyond the solubility in the demineralizer, resulting in deposits which interfere with the operation and shortening the useful life of the demineralizer.

SUMMARY OF THE INVENTION

The water treatment of the present invention consists of a preconditioner unit and a salinity buffer-storage tank unit which can be used separately or in combination, and also in conjunction with a demineralizing unit. The preconditioner unit comprises two containers which operate in push-pull arrangement, i.e., the first container receives raw water and discharges product water while the second container receives brine or waste water resulting from the treatment or utilization of the product water leaving the first container. Both containers can contain a strong acid cation exchanger (ion exchange resin) which favors the take-up of polyvalent cations (such as calcium ions) from low concentration electrolytes (such as raw feed water introduced to the first container) and which can be regenerated by conversion to a univalent cation form by a more highly concentrated electrolyte (such as the brine returning to the second container from the water treatment or utilization system). Accordingly, the feed water to a demineralizer or other water treatment or utilization process can be softened by such a strong acid resin if the resin is frequently regenerated by the more highly concentrated waste stream. Thus, if the two tanks containing the strong acid resin are arranged in "push-pull" with one in service to soften the raw incoming water and one in regeneration, short duty cycles can be provided so that the system will be effective with only the partial regeneration which can be provided when the concentration difference between the feed and water stream is not large.

Another aspect of the present invention relates to the use of weak base resin in two containers of a preconditioner which operate in push-pull arrangement, i.e., the first container receiving the raw incoming water and the other container receiving the return waste water. Anion exchanging material such as those made from weak electrolyte resin are, when equalibrated in water of neutral or basic pH, only partially ionized; deionization referring to adsorption of acid by the resin. The extent of this partial ionization or take-up of acid depends upon the extent of mineralization or salinity of the environment of the ion exchanger sorbent and also upon the acidity of the environment. Accordingly, the product water to a demineralizer or other water treatment or utilization process can be partially acidified by passing through a bed of weak electrolyte anion exchangers which is periodically regenerated by the more concentrated brine stream. Thus, if the two tanks of a preconditioner containing the weak base ion exchanger are arranged in push-pull with one in service and the other in regeneration, the product water can be partially acidified during short duty cycles and the scale forming substances in the incoming water remain more soluble in the water.

The use of only strong acid resin in a pair of containers arranged in push-pull can be utilized to presoften water going to demineralizers, cooling towers, evaporators, etc., from which the return water is concentrated brine. Also, the use of only a weak base resin in a pair of containers arranged in push-pull can be utilized to increase the acidity of the water so the scale forming substances are more soluble in the water. The present invention also contemplates the use of both a strong acid resin and a weak base resin in each of two containers of a preconditioner operating in push-pull to obtain the combined effect of each resin on the feed water.

The present invention also provides a combination storage tank-salinity buffer for use with a demineralization system. The tank contains a mixture of anion responsive carbon particles and cation responsive carbon particles, the particles being made separately and then mixed together before placing in the tank. These carbon particles act as a buffer. The extent of salt take-up by the carbons is a function of the saltiness of the surrounding water in the storage tank, which receives water from the demineralizer unit for storage therein. When water of low salt concentration is received, the carbon gives up salt and the salt goes back to the demineralizer and is removed. Thus, in periods of off demand and overnight, salt is continually pumped out of the salinity buffer. During periods of high demand, some raw water is introduced directly to the storage tank and salt is then removed directly by the carbon particles to assist the demineralizer. Thus, the salinity buffer serves to damp out transient demand induced salinity excursions and permits the use of a smaller storage tank.

The storage tank also contains a weak base ion exchange resin which acts as a buffer to resist changes in pH. During periods of salt adsorption by the carbon particles, the weak base resin adsorbs acid from the water so that water delivered to the customer becomes more basic. However, during the night and in periods of off demand, the recirculating water leaches out acid from the buffer which goes out through the demineralizer to the waste stream. Thus, the weak base resin cooperates with the carbon particles to make regeneration more effective.

It is understood that the preconditioner or storage tank-salinity buffer or both can be used with a number of different demineralization systems, such as electrodialysis, electrosorb (U.S. Pat. No. 3,515,664), and sorption-dialysis described in pending U.S. application Ser. No. 107,997, filed Jan. 20, 1971, by Allan M. Johnson and assigned to the same assignee.

BRIEF DESCRIPTION OF THE DRAWINGS

FIG. 1 is a diagrammatic illustration of a preconditioner utilizing a strong acid cation exchanging resin for softening the incoming water;

FIG. 2 is a diagrammatic illustration of a preconditioner utilizing a weak base resin for acidifying the water;

FIG. 3 is a diagrammatic illustration of a complete water demineralization system utilizing a preconditioner and storage tank-salinity buffer in combination with a demineralizer;

DESCRIPTION OF THE PREFERRED EMBODIMENT

Figure 5:
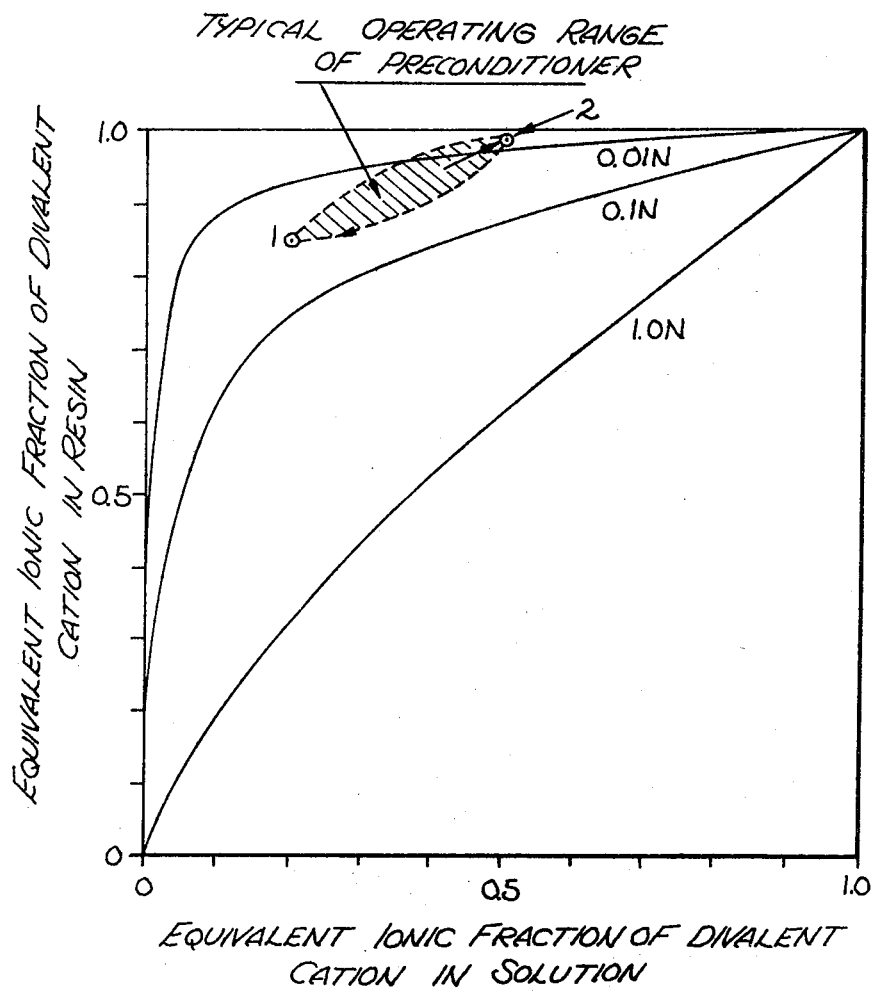
FIG. 5 is a graphic illustration showing isotherms for typical commercial strong acid cation exchange resin, and the selectivity for sorption of divalent cations vs. sodium ions as a function of dilution of the surrounding solution.

FIG. 1 illustrates two containers 5 and 6 of a water preconditioner which are connected together in a push-pull arrangement. Each container is filled with a porous cation exchanging material, such as carbon particles 7 coated with a strong acid cation exchanging resin. The incoming raw feed water is supplied to a four-way valve 8 from line 9 and is connected with container or tank 5 by valve line 10 and passage 11. The water flows through container 5 and past the strong acid resin and softened water leaves container 5 through passage 12, passage 14 of valve 15 and soft water product line 16. At the same time, concentrated waste water from a water treatment or utilization system, such as a demineralizer, cooling tower, evaporator, etc., returns through line 18 to passage 19 of valve 15 and then to container 6 through passage 20. The concentrated water flows through the strong acid resin and out passage 22 to passage 23 of valve 8 to the waste water discharge passage 24. The valves 8 and 15 cause counterflow operation of the two containers. Also, by switching the valves to place the dotted line passages in use, short duty cycles can be provided for the two tanks.

The thermodynamics of cation exchanging materials favor the take-up of polyvalent cations (such as calcium ions) from low concentration electrolytes and their regeneration by conversion to a univalent cation form by a more highly concentrated electrolyte. Thus, the feed water can be softened by such a resin if the resin is frequently regenerated by the more highly concentrated waste stream.

The strong acid has more affinity to $Ca^{++}$ and will take out $Ca^{++}$ at the low concentration in the incoming feed water, leaving a high concentration of $Na^+$ since two $Na^+$ are added for each $Ca^{++}$ leaving. When the dilute electrolyte in the form of incoming raw feed water is introduced to tank 5, the strong acid resin particles 7 are in the sodium form ($2\ RSO_3^-\ Na^+$) and $Ca^{++}$ in the incoming water exchanges with the sodium on a portion of the resin in order to liberate sodium, as follows:

$$2\ RSO_3^-\ Na^+ + Ca^{++} \rightleftharpoons (RSO_3^-)_2\ Ca^{++} + 2Na^+$$

Thus, the resin involved in the exchange takes up $Ca^{++}$ from the water and gives up $Na^+$ to the water. At the start, the resin will have a significant fraction, such as several percent, of exchange capacity in the $Na^{++}$ form. At the end of the introduction of feed water to tank 5, the bulk of $Na^+$ will have been displaced and replaced by $Ca^{++}$.

At the same time as the dilute electrolyte (feed water) is entering tank 5, the waste water of high salinity is connected through line 18 to tank 6. At the start of the introduction to tank 6, the resin particles 7 are approximately all in the $Ca^{++}$ form. In the presence of the high content of total dissolved ionic solids in the waste water, a significant faction of the resin will revert to the Na form ($2\ RSO_3^-\ Na^+$) and the liberated $Ca^{++}$ will leave through waste passage 24. Thus, if the feed water and waste water are switched back and forth between tank 5 and tank 6 at selected intervals, $Ca^{++}$ will be first removed from the feed water in one flow condition and will then be released to the waste water in the next flow condition. The switch time will generally occur when the amount of $Na^+$ liberated drops down to an unacceptable level. It is pointed out that the resin is always strongly ionized with either $Na^+$ or $Ca^{++}$ on the particles. Since the waste water from a demineralizer, cooling tower or evaporator is always high in total dissolved ionic solids, the system just described can be utilized to reduce scale forming substances in the raw water entering such devices. The valves 8 and 15 can be switched together by any suitable timing device 26 at selected intervals and upon switching, the valve passage assumes the dotted line positions to switch the flow in tanks 5 and 6.

FIG. 5 shows isotherms for typical commercial strong acid cation exchange resin and illustrates the selectivity for sorption of divalent cations vs. adsorption of sodium ions as a function of dilution of the surrounding solution.

Point 1 of FIG. 5 illustrates a typical condition of the resin after it has been regenerated with the waste water. In this condition the resin consists of about 80 percent $Ca^{++}$ and 20 percent $Na^+$ ion fractions. The flow of raw water through the resin can continue until the ion fraction of $Ca^{++}$ in the resin rises to a level of about 95 percent (Point 2 of FIG. 5) above which an unacceptable amount of calcium will pass through the bed. The incoming raw water will be a dilute water of about 0.004 normally and approximately equal ionic fractions of $Na^+$ and $Ca^{++}$. On the other hand, the waste water which regenerates the resin will typically have a normality of about 0.03 and the ionic fractions of $Ca^{++}$ and $Na^+$ will be about 20 percent and 80 percent respectively.

FIG. 2 illustrates a water treatment apparatus identical to that of FIG. 1 and like parts are designated by the same numerals primed. However, tanks 5' and 6' contain a weak base anion exchanging resin in the form of particles 30 rather than a strong acid resin as in FIG. 1. When the dilute electrolyte (raw water) is introduced to tank 5' from passage 9' through valve passage 10' and passage 11', the weak base resin is in the form $RNH_3^+\ Cl^-$ and when contacted by the dilute raw water the following results:

$$RNH_3^+ Cl^- + H_2O \rightleftarrows RNH_2 + H^+ + Cl^- + H_2O$$

Thus, acid in the form of HCl is added to the feed water leaving tank 5' through passage 12', valve passage 14' and acidified water line 16'. The acidified water in passage 16' goes to a water treatment or utilization process and has increased solubility for $Ca^{++}$ and similar substances in order to aid in the prevention of scale deposits. At least a small percentage of the acid form $RNH_3^+ Cl^-$ changes to the neutral form $RNH_2$ before the tanks are switched by the movement of valves 8' and 15' to place the dotted line passages in operation. The valves are switched between the full and dotted lines simultaneously by a timer 26'.

The brackish waste water returning from a water treatment or utilization process is introduced through passage 18', valve passage 19' and passage 20' to the tank 6'. Any HCl in the waste water will be picked up because of the higher concentration of the dissolved ionic solids and the small percentage of $RNH_2$ will return to $RNH_3^+ Cl^-$. Thus, acid will be picked up for return to the raw water upon reswitching of the tanks. If no HCl exists in the waste water, the water will break down by hydrolysis into $H^+$ and $OH^-$, and $Cl^-$ will be collected from the water to produce $RNH_3^+ Cl$. Thus, the system of FIG. 2 will pick up from the waste water any acid regenerated in the treatment or utilization system, and if no acid is present in the waste water, the resin will still return to the acid form. The tanks can be switched by timing device 26' when the addition of HCl to the water drops below an acceptable level in either tank 5' or 6' when the particular tank is being utilized to add acid to the feed water.

The weak base resin 30 utilized in FIG. 2 can be mixed with the strong acid resin present in tanks 5 and 6 of FIG. 1, in a complete demineralizing system, such as illustrated in FIG. 3, wherein like numerals represent like parts as in FIG. 1. The two tanks 5 and 6 and the timing device 26 of FIG. 3 together with associated piping are referred to as the preconditioner section 28 of the demineralizing system. The incoming raw feed water from line 9 is initially introduced into tank 5 through valve passage 10 and passage 11. In tank 5, the $Ca^{++}$ is removed by the strong acid resin 7 to soften the water and the water is acidified by the weak base resin 30 in order to increase the solubility of $Ca^{++}$ in the water. The water leaves tank 5 by passage 12 and passage 16 which connects with passage 32 through a check valve 31. Passage 32 connects with passage 34 through passage 35 in four-way valve 36.

The demineralizer section 38 of the demineralizing system comprises an ion permeable membrane 40 which divides casing 41 into two compartments 42 and 43, and passage 34 connects with compartment 42. In one embodiment, the compartments 42 and 43 each contain a permeable cation responsive (collecting) electrode and the membrane 40 is permeable to anions but not to cations.

The demineralizer section 38 is the subject matter of copending U.S. application Ser. No. 107,997, filed Jan. 20, 1971, by Allan M. Johnson and assigned to the same assignee. It is understood that other types of demineralizer units can be used in this invention, such as electrodialysis or electrosorb (U.S. Pat. No. 3,515,664) in place of the unit of said copending application.

A second passage 45 connects between passage 16 and passage 46 through passage 47 of valve 36, and passage 46 introduces feed water to compartment 43. The outlet passage 50 from compartment 42 connects with passage 51 through passage 52 of valve 53 and passage 51 leads to the salinity buffer-storage tank 55. Outlet passage 60 from compartment 43 connects with passage 61 through passage 62 in valve 53 and passage 61 connects to tank 6 through valve 15 and passage 20.

A direct current power supply 65 is connected through reversible switch 66 to leads 67 and 68 terminating in wires 69 and 70, respectively, which serve to supply and distribute the electric potential to the electrodes 42 and 43. In the position of the switch shown in FIG. 3, the wire 69 is connected to the positive side of the current supply 65 and wire 70 is connected to the negative side. In the dotted alternate position of the switch, the polarity of wires 69 and 70 is reversed.

The compartments 42 and 43 are shown filled with coated carbon particles 72 and 73, respectively, forming the cation responsive carbon electrodes in each compartment. The particles are sufficiently packed to be electrically conductive and yet permit the passage of fluid from one of the compartment to the other. Any sufficiently porous carbon can be used instead of granular carbon in each electrode compartment and the carbon may or may not be chemically treated to enhance its affinity for cations and may or may not have cation permeable materials deposited within the micropores and upon the extensive surface of the carbon. A treatment of carbon particles to produce cation and anion responsive electrode materials is described in said U.S. Pat. No. 3,515,664 and comprises applying cation or anion responsive material in fluid form and then effecting their polymerization on the carbon particles. However, any suitable treatment may be used for granular or porous carbon, or untreated carbon can be used. For instance, cation responsive carbon can be prepared by a two-step process, the first step being carboxylation and the second step consisting of filling the pore volume of the carbon with a strongly ionized cation exchange resin.

The first step can be accomplished by oxidizing the carbon surfaces using a hot mixture of concentrated sulfuric and nitric acids. This procedure will produce weak acidic carboxylic surface compounds which will in turn: produce a negative charge on the surfaces, reducing the tendency to adsorb anions; enable the electrode to transform faradaic currents associated with electrolysis of water into cation responsiveness by buffering the resulting pH effects; and also by means of buffering capacity, to eliminate deleterious effects such as pH induced precipitation of insoluble carbonates.

The second step can be accomplished by first filling the pores of previously dried carbon with phenolsulfonic acid after which formaldehyde can be added prior to curing at elevated temperature. This procedure results in filling the pore volume with a cross linked resin which is permeable to cations but not to anions. Thus the carbon is made cation responsive. Additionally, the resin filled pores are provided with a permanent supporting electrolyte which enhances the current carrying capability when operating in waters of low salinity.

The salt entering both compartments 42 and 43 with the feed water is composed of sodium ions with a positive charge and chlorine ions with a negative charge. When an electric current is sent through the water flowing through the electrodes by closing switch 66, the negative chlorine ions in compartment 42 are drawn through membrane 40 toward the positive electrode particles 73. A chlorine ion is shown in FIG. 3 passing through membrane 40. This action leaves excessive sodium cations ($Na^+$) which are absorbed by the negative electrode particles 72. The additional electrons required to maintain electroneutrality are moved by the power source from particles 73 to particles 72, thereby releasing sodium ions from particles 73 into compartment 43. However, the released sodium cations cannot pass through membrane 40 toward particles 72. Thus, it can be seen that sodium and chloride ions are removed from water flowing in compartment 42 thereby producing product water, and that sodium and chloride ions are added to the water flowing in compartment 43 thereby producing waste water in the form of brine.

It is pointed out that the valves 36 and 53 can be moved together from the full line positions of FIG. 3 to the dotted line positions to then connect compartment 42 to tank 6 of the preconditioner and compartment 43 to the storage tank 55. At the same time, the switch 66 can be moved from the full line to the dotted line position in order to change the polarity of wires 69 and 70. Thereafter, the product water will be produced in compartment 43 and the waste water will be produced in compartment 42. This changing of valves 36 and 53 and switch 66 can be accomplished by timing device 80. By switching the polarity in compartments 42 and 43, the sodium ions which were previously adsorbed on particles 72 are now desorbed by particles 73 and sodium ions are now adsorbed by particles 73. Thus, the electrodes 72 and 73 maintain an acceptable capacity to adsorb and desorb cations.

At the same time, the valves 15 and 8 are switched by timing device 26 to maintain the desired relationship between the time of raw water flow and brine flow in the tanks 5 and 6. Of course, the timing devices 26 and 80 must be so related that waste water continues to flow through the tank 5 and or 6 that is to receive the waste water after switching of valves 36 and 53.

Referring again to FIG. 3, the tank 55 contains a weak base anion exchange resin in the form of particles 82 and a mixture of anion responsive carbon particles 83 and cation responsive carbon particles 84. Passage 51 introduced product water to tank 55 through outlet 51a located near the top of the tank. A passage 87 has an inlet 87a located near the bottom of tank 55 and is connected to pump 88 which pumps product water from the tank into passage 89. The product water is removed from the system to the point of use through passage 90 connected to passage 89 and containing a valve 91.

Passage 89 connects with passage 32 and contains a check valve 92. The product water not removed from passage 89 through passage 90 recirculates through compartment 42 where it is mixed with incoming raw water to produce a low salinity water product. Because of the check valve 31, only incoming raw water is introduced and circulates through compartment 43. Thus, when product water is not withdrawn in quantity, the water in tank 55 is recirculating through the demineralizer 38 and is low in total dissolved solids. However, when product water is being drawn off, the product water received in tank 55 is of higher salinity.

In general, product water is drawn off in light commercial application during the 9 hour period from 8:00 a.m. to 5:00 p.m., and during the fifteen hour period from 5:00 p.m. to 8:00 a.m., no substantial product is being drawn off but the demineralizer 38 is still operating. When the dilute solution present in the tank during the night contacts the weak base anion exchange resin 82, acid is leached out of the weak base resin in accordance with the following relation previously described in connection with the preconditioner 28:

The acid goes to the demineralizer 38 and passes into waste water which in turn enters the preconditioner, when acting in the regeneration mode. Thus, the weak acid in the preconditioner absorbs the acid in the waste water and upon change in mode, the preconditioner recycles the acid back into the incoming feed water.

During the product water withdrawal period during the day, the weak base exchange resin is contacted by more salty product water and extracts acid from the water in order to regenerate the resin. At the same time, the extraction of acid makes the product water withdrawn from passage 90 less acid than it would otherwise be so that the water will not be so corrosive. Therefore, the effect of the weak base resin 82 is to produce acid during the night which goes to the waste water stream and aids in removal of scale forming substances. During the day, the weak base resin forms base which goes out with the product water.

Figure 4:
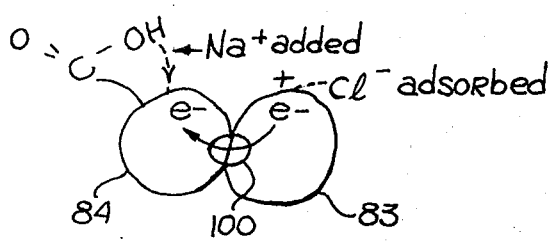
FIG. 4 is a schematic illustration of a cation exchange particle and an anion exchanger particle in electrical contact to provide a salinity buffer in the storage tank.

The particles 83 and 84 in tank 55 are utilized as a salinity buffer. The anion responsive carbon particles 83 and cation responsive particles 84 are in electrical contact with one another in area 100 as schematically illustrated for two such particles in FIG. 4. The cation responsive carbon particle is pretreated with a mixed oxidizing acid to provide carboxylic (COOH) surface groups and the anion responsive carbon can be untreated or filled with an anion exchanging substance. When the product water in tank 55 is relatively salty, the COOH groups coated on the particles 84 takes up sodium from the water and adsorbs $H^+$ because of the natural flow of electrons ($e^-$) from particles 83 to particles 84. At the same time, $Cl^-$ is adsorbed on particles 83 as illustrated in FIG. 4. The action is given by the following relationship:

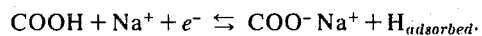

Since the above relationship is reversible, the particles adsorb salt from salty water and release salt to dilute water, so long as the particles 83 and 84 are in contact to allow electron flow.

During the 9 hour period from 8:00 a.m. to 5:00 p.m. that the product water is being more heavily withdrawn, the product water reaching tanks 55 is relatively salty since it is not recirculated through the demineralizer section 38. During this period, the salinity buffer particles will remove salt from the water to improve the quality of the transient waves of poorer quality water. During the nightly period of from about 5:00 p.m. to 8:00 a.m., no substantial product water is being withdrawn, and recirculation of the product water through the demineralizer produces a dilute product water. The salinity buffer in contact with the dilute water causes the above reaction to reverse and the buffer gives up salt to the water. This salt is then removed by the demineralizer and dumped overboard by the preconditioner 28. Overnight and during off demand periods, salt is continually pumped out of the salinity buffer because the electron flow is reversed. Thus, the tank 55 acts to level off transient waves of product water demand. A much larger simple storage tank would be required to produce the same effect. It is apparent that the preconditioner, and the salinity buffer, including the acid control by particles 82, all depend upon the demineralizer to produce a concentration difference in the product water which cause the particles in the preconditioner and in the storage tank to undergo reversible reactions to maintain the acidity of the water passing through the demineralizer and an acceptable salt level in the outgoing product water.

The operation of the complete system illustrated in FIG. 3 will first be described with valves 8, 15, 36 and 53 all in the positions shown. Raw water of high salt content enters the system from passage 9 and contacts the cation exchanger particles 7 and the weak base particles 30 in the tank 5. The particles 7 in tank 5 serve to remove $Ca^{++}$ from the feed water to presoften this water and the particles 30 in tank 5 serve to add acid to the incoming feed water to increase the amount of salt that can be held in solution. At the same time, waste water (brine) is discharged from the system through tank 6 and serves to regenerate the particles 7 and 30 in tank 6 while the raw water enters through tank 5. In the regeneration, the particles 7 revert to the sodium form liberating $Ca^{++}$ and the particles 30 return to the acid form in order to thereafter add acid to the feed water when feed water is introduced through tank 6. When the amount of $Ca^{++}$ removed and amount of acid added to the feed water reduces to a predetermined level, the operation of the tanks can be switched by timer switch 26. Thus, the feed water is treated in preconditioner 28 to have reduced $Ca^{++}$ content and have more $Ca^{++}$ capacity when the feed water reaches the demineralizing unit 38.

The feed water is introduced to the demineralizer unit 38 from the tank 5 or 6 of the preconditioner which is receiving the raw water. In FIG. 3, raw water enters from passage 12 through valve 15 and to compartments 42 and 43 through passages 34 and 46. The feed water is composed of sodium ions with a positive charge and chlorine ions with a negative charge. The electrical potential applied between wires 69 and 70 causes the chlorine ions to be drawn through membrane 40 and causes the remaining sodium ions to be absorbed on negative electrode particles 72. At the same time, the electron flow from particles 73 to particles 72 releases sodium ions from particles 73 into compartment 43. Therefore, the product water leaves through passage 50, valve 53 and the passage 51 into tank 55 and the waste water leaves compartment 43 through passage 60 and passage 61 to tank 6 of the preconditioner 28 where it serves to regenerate the cation ion exchanger particles 7 and the weak base particles 30. When the sodium particles absorbed on particles 72 reaches a high level, the switch 66 can be changed to cause product water to be produced in chamber 43 and waste water to be produced in chamber 42. The product water would then leave tank 55 through passage 60 and valve 53 and passage 51 and the waste water would flow through passage 50, valve 53 and passage 61 to the tank of preconditioner 28 which is being regenerated. Thus, by utilizing the timing devices 26 and 66, both the preconditioner and the demineralizer unit 38 can be cycled to obtain the most efficient operation of both.

While the operation of the demineralizer unit has been described in connection with the removal of sodium and chloride ions, these ions are referred to only as illustrative of the operation of the unit since the unit also removes from brackish water other cations, such as $Ca^{++}$, $Mg^{++}$, and $K^+$, and other anions, such as $SO_4^-$, $HCO_3^-$ and $NO_3^-$. It is understood that the electrode particles in compartments 42 and 43 could be anion responsive and the membrane would then be permeable to cations.

The product water entering the tank 55 is relatively salty during the day time hours of 8:00 a.m. to 5:00 p.m. and the salinity buffer comprised of particles 83 and 84 in electrical contact, serve to take up sodium from the water to aid in demineralizing the water. During the night period, the product water is recirculated and is dilute so that its contact with the salinity buffer causes the buffer to give up salt to the water which is then dumped overboard by the preconditioner 38. Also, the weak base ion exchange resin particles 82 in tank 55 act during the day time hours to extract acid from the more salty product water. During the night time hours, acid is leached out of the weak base 82 in order to recycle the acid back into the preconditioner.

Thus, the change in concentration produced by the demineralizer unit permits one tank of the preconditioner to remove calcium and add acid to the raw feed water while the other tank connected in "push-pull" is being regenerated. At the same time the salinity buffer and weak base resin in the storage tank remove additional salt and acid when a high product water demand is existing and gives up salt and acid to the dilute recirculating product water during periods of off demand. The acid is returned to the preconditioner through the demineralizer and the salt is released and dumped overboard through the demineralizer.

As previously stated, the preconditioner can be used by itself or with various types of demineralizer units and with or without the storage tank and buffer. Also the storage tank and buffer could be utilized with the demineralizer unit, without using the preconditioner. Various other system can be devised in which the preconditioner and the storage tank with salinity buffer can be utilized alone or in combination.

What is claimed is:

1. A water demineralizing system comprising:
   an apparatus for demineralizing water to produce product water;
   a storage container having an inlet passage and an outlet passage;
   said inlet passage being connected to the product water discharged from said demineralizer apparatus, said outlet passage being connected with a product water removal passage and with a water passage leading to said demineralizer apparatus;

a pump in said product water outlet passage for continually returning product water to said demineralizer apparatus during off demand periods to reduce the total dissolved ionic solids in the product water within said tank;

said storage container containing a permeable weak base anion exchange resin for adding acid to the product water in the tank when the product water is low in dissolved ionic solids during off demand periods and for extracting acid when the water is higher in dissolved ionic solids during water withdrawal periods;

a preconditioner receiving raw incoming water and discharging water to said demineralizing apparatus, said preconditioner comprising a first tank having an inlet for receiving the incoming raw water and an outlet for discharging treated water to said demineralizing apparatus;

a second tank having an inlet for receiving waste water discharged from said demineralizing apparatus and having an outlet for dumping said waste water overboard; and, a permeable, weak base anion exchanger in both said tanks, said exchanger in said first tank giving up acid to said incoming raw water before the water is directed to said demineralizing apparatus to increase the solubility of scale forming substances, said exchanger in aid second tank picking up acid from said waste water;

the acid return to said demineralizer from said storage container during off demand periods being transferred to said waste water in said demineralizing apparatus and aiding in the regeneration of said exchanger in said second tank during the time incoming raw water flows through said first tank.

2. A water demineralizing system as defined in claim 1 wherein said storage container contains a mixture of permeable anion and cation responsive exchangers in electrical contact with one another to provide a salinity buffer, said cation responsive exchanger being pretreated with an oxidizing acid, said exchangers adsorbing cations from the product water during water withdrawal periods and releasing salt to the product water during low demand periods.

3. A water demineralizing system as defined in claim 2 wherein said first and second tanks of said preconditioner also contain a permeable, strong acid cation exchanger, said exchanger in said first tank taking up polyvalent cations from the incoming raw water before the water is directed to said demineralizing apparatus, said exchanger in said second tank being regenerated by conversion to a univalent cation form by said waste water discharged from said demineralizer apparatus.

4. A water demineralizing system as defined in claim 1 wherein said demineralizing apparatus comprises a membrane permeable to either cations or anions but not to both;

separate compartments on opposite sides of said membrane;

means for connecting the treated water discharged from first tank of said preconditioner to both said compartments;

each compartment containing an electrode responsive to counter ions of the opposite charge to those passing through said membrane, each electrode being permeable to permit the flow of the treated water therethrough; and means for applying a potential across said electrodes to cause one electrode to absorb said counter ions and the other electrode to desorb said counter ions.

* * * * *